Aug. 31, 1954  J. W. THOMAS  2,687,900
DRAWBAR LOCK
Filed Sept. 22, 1952  2 Sheets-Sheet 1
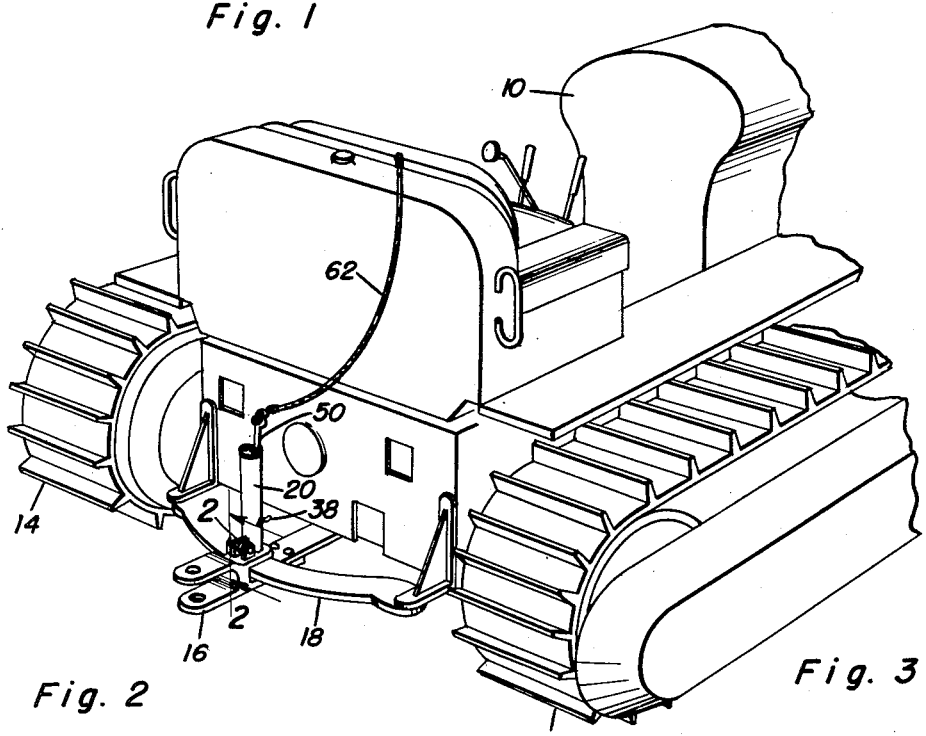
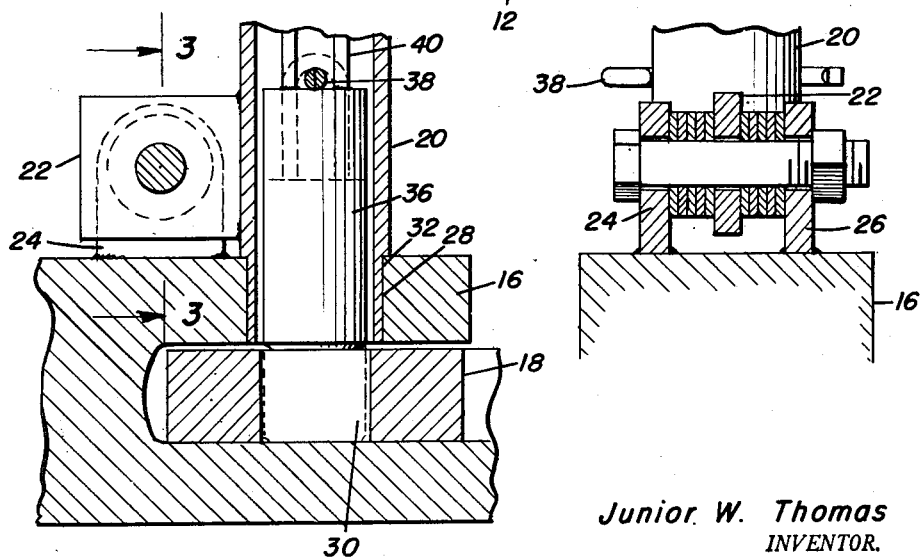
Junior W. Thomas
INVENTOR.
BY Clarence A. O'Brien
and Harvey B. Jacobson
Attorneys Aug. 31, 1954  J. W. THOMAS  2,687,900
DRAWBAR LOCK
Filed Sept. 22, 1952  2 Sheets-Sheet 2
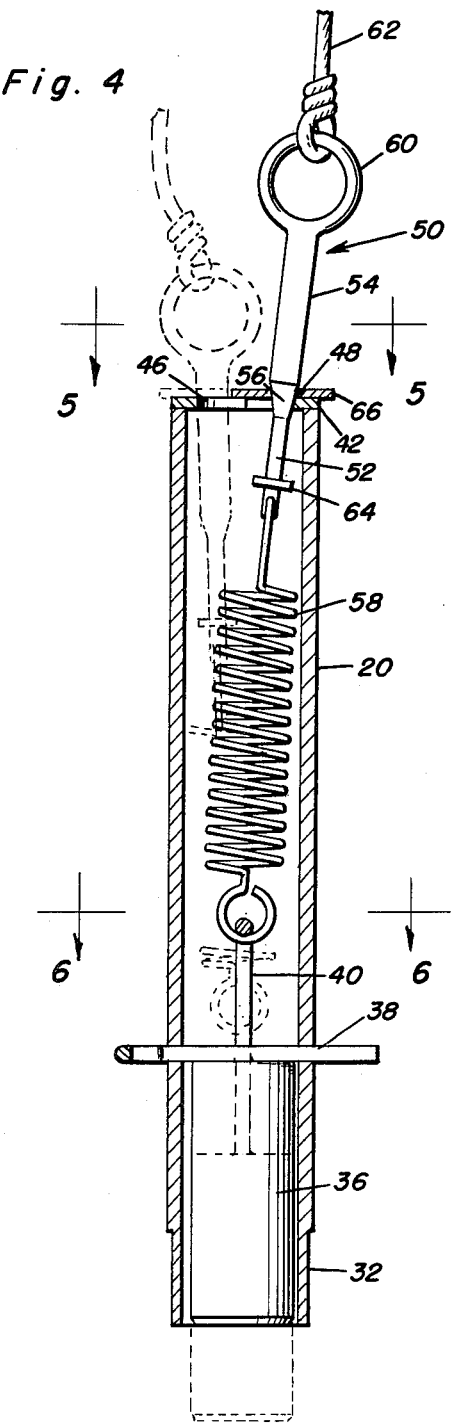
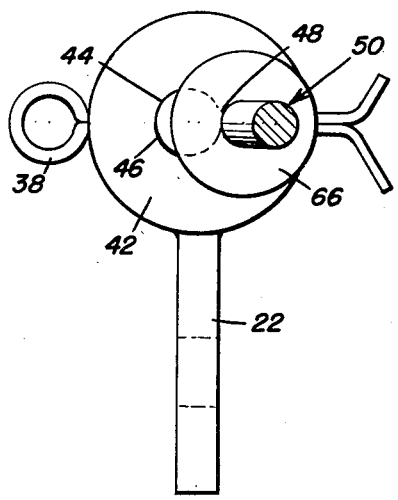
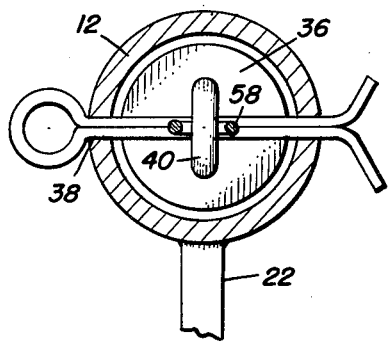
Junior W. Thomas
INVENTOR.

Patented Aug. 31, 1954

2,687,900

UNITED STATES PATENT OFFICE 2,687,900

DRAWBAR LOCK

Junior W. Thomas, Walla Walla, Wash.

Application September 22, 1952, Serial No. 310,829

4 Claims. (Cl. 280—515)

This invention relates to a draw bar lock and particularly to a lock for mounting on a free swinging draw bar to lock the draw bar in a predetermined position on a slide bar.

In the operation of tractors it is desirable to have a free swinging draw bar in order to have the maximum power output from the tractor. However, in certain operations, such as when the tractor is holding on a downhill turn it is very desirable to lock the draw bar in a predetermined position with relation to the tractor to prevent the load overrunning and causing the draw bar to be suddenly jammed against the end of the slide bar therefor.

It has heretofore been known to provide locking pins for engagement in a hole in the swinging bar and in the guide bar but it has been necessary to stop the tractor and produce perfect alignment between the swinging bar and guide bar before the locking pin could be placed in position. Likewise, it is necessary to stop the bar and frequently maneuver the tractor before the pin can be withdrawn because of the binding action of the load against the draw bar.

The present invention provides a draw bar lock in which the locking pin may be held out of locking engagement so that the bar may have a free swinging motion or may be released so as the bar swings to bring the locking apertures of the bar and the guide bar into aligned relation the locking bar will drop into place to lock the swinging bar firmly on the slide bar.

It is accordingly an object of the invention to provide an improved lock bar for a tractor device.

It is a further object of the invention to provide a locking device which can be maintained in unlocked position.

It is a further object of the invention to provide a locking device which may be released and will automatically lock the bar as soon as it falls into position.

It is a further object of the invention to provide a locking device which can be biased to unlocking position so that the bar will be unlocked as soon as the swinging bar is in a position of no strain on the locking pin.

Other objects and many of the attendant advantages of the present invention will be apparent from the following detailed description taken in conjunction with the accompanying drawing in which:

Figure 1 is a perspective view of the rear end of the tractor showing the locking device mounted for locking a free swinging draw bar to a slide bar;

Figure 2 is an enlarged vertical section taken substantially on the plane indicated by the line 2—2 of Figure 1;

Figure 3 is a vertical section through the mounting for the locking device and taken substantially on the plane indicated by the line 3—3 of Figure 2;

Figure 4 is an enlarged vertical section taken substantially on the plane indicated by the line 4—4 of Figure 5;

Figure 5 is a top view of the locking device taken substantially on the plane indicated by the line 5—5 of Figure 4; and Figure 6 is a cross section through the locking device taken substantially on the plane indicated by the line 6—6 of Figure 4.

In the exemplary embodiment of the invention, a tractor 10 is provided with a pair of tracks 12 and 14 for propelling the tractor 10 to which is hitched a free swinging draw bar 16. The draw bar 16 being guided by means of a slide bar 18 which is preferably arcuate in formation so that the bar will readily slide on the slide bar 18. The locking device comprises an elongated casing 20 preferably of cylindrical or tubular formation and having an ear 22 for connecting the casing 20 onto a portion of the draw bar 16. The draw bar 16 is usually provided with a pair of upstanding ears 24 and 26 for mounting a locking pin for cooperation with an aperture 28 in a portion of the draw bar 16 and an aperture 30 in the slide bar 18. Preferably the end 32 of the housing 20 is provided of reduced diameter and inserted in the aperture 28 of the draw bar 16 so that the housing 20 is rigidly mounted with respect to the draw bar 16.

The locking pin 36 is slidable in the housing 20 and a stop 38 preferably in the form of a cotter key is inserted through the housing 20 so that the pin 36 is stopped as soon as the pin is completely withdrawn into the housing. A link 40 is rigidly connected in longitudinal relation to the pin 36 so that the pin 36 is projected from the housing 20 so that it may extend through the aperture 30 in the slide bar 18. The stop 38 therefore reduces or limits the extent of sliding motion of the pin 36 so that it may be safely housed in the housing or casing 20 or may be projected through the aperture 30 to lock the bar 36 to the slide bar 18.

A closure member 42 is applied to the top of the housing 20 and may be secured by any suitable means such as welding, brasing or even by a threaded connection. The closure 42 is provided with a key hole slot 44 having a relatively large opening 46 and a relatively smaller opening 48. An actuating rod 50 has a lower end 52 of reduced cross-section and an upper end 54 of large cross-section, there being a tapered portion 56 intermediate the larger and smaller sections. The large section 54 will readily pass through the opening 46 of the key hole aperture 44 while the smaller portion 52 will readily pass through the smaller portion 48 of the key hole opening while the larger portion 54 will be incapable of passing therethrough. Preferably the smaller portion 48 of the key hole aperture 44 is provided with a sloping side wall so that the tapered portion 56 of the actuating rod 50 will seat snugly on the smaller portion 48 of the key hole aperture. The spring 58 is connected to the lower end of the reduced portion 52 and to the link 40 connected to the pin 36. The spring 58 is of sufficient tensile strength so it will normally lift the weight of the pin 36 but is sufficiently weak that it may be stretched so that the spring may be tensioned to lift the pin 36 after it is relieved of a binding action. The actuating rod 50 is provided with a ring-like terminal 60 to which is connected an actuating tensile member such as a rope 62. A stop in the form of a washer 64 is mounted on the reduced portion 52 of the actuating rod 50 between the tapered portion 56 and the end of the spring 58, the stop portion 64 being of sufficient size that it will not pass through the enlarged portion 46 of the key hole aperture 44. A sealing member 66, preferably in the form of a washer, has an aperture sufficient to pass the portion 54 of the actuating rod 50 but incapable of passing the rings 60 on the end thereof.

In the operation of the device for normal purposes the actuating rod 50 will be lifted upwardly and moved into the smaller portion of the key hole aperture 44 so that the tapered portion 56 will seat in the portion 48 of the key hole aperture so that the spring will lift the pin 36 against the stop 38 and maintain it retracted into the casing 20. When it is desired to lock the draw bar 16 to the slide bar 18 the actuating rod 50 is lifted by means of a cord or tension device 62 and shifted so that the large portion of the rod 50 will pass through the aperture 46 and release the spring which allows the pin 36 to project below the lower end of the casing 20 and when the pin is in alignment with the aperture 30 of the slide bar 18 the pin 36 will drop into locking relation therewith to lock the bar 16 firmly to the slide bar 18. The sealing washer 66 substantially closes the key hole aperture 44 so that there is little chance of dirt or other material falling therein. When the pin 36 is in locking position and it is desired to release the draw bar 16 for free swinging action on the slide bar 18, the tensile member 62 is pulled upward so that the portion 52 may be seated in the small portion of the key hole slot 44 with the stop 64 preventing complete withdrawal of the actuating bar 50 from the key hole slot. With the conical portion 56 seated in the aperture 48 the spring 58 will be under tension and will tend to lift the pin 36 so that as soon as strain is removed from the bar 16 to release the pin 36 it will be retracted into the casing 20 and release the bar 16. It will accordingly be seen that there has been provided a locking device which is readily operated from the seat of the tractor device and which will when released automatically couple the swinging bar to the slide bar as soon as the apertures are in proper alignment and when it is tensioned to releasing position the spring would automatically withdraw the locking pin 36 as soon as the strain has been removed therefrom so that the device may be utilized without stopping the tractor or maneuvering the same to line up the apertures in the swinging bar and the guide bar therefor.

While for purpose of illustration a particular embodiment of the invention has been shown, and described according to the best present understanding thereof, it will be apparent to those skilled in the art that changes and modifications can be made therein without departing from the true spirit of the invention.

Having described the invention, what is claimed as new is:

1. A draw bar locking device comprising an elongated casing, a lock pin slidable in said casing, means for limiting longitudinal motion of said pin in said casing, a closure applied to one end of said casing, said closure having a key hole aperture, a tapered rod extending through said aperture, the larger part of said rod passing freely through the larger part of said aperture but incapable of passage through the smaller part of said aperture, a resilient connection between said rod and said pin within said casing.

2. A draw bar locking device comprising an elongated casing, a lock pin slidable in said casing, means for limiting longitudinal motion of said pin in said casing, a closure applied to one end of said casing, said closure having a key hole aperture, a tapered rod extending through said aperture, the larger part of said rod passing freely through the larger part of said aperture but incapable of passage through the smaller part said aperture, a resilient connection between said rod and said pin a stop secured on the smaller end of said rod within said casing, said stop having outside dimensions greater than the larger portion of said key hole aperture.

3. A draw bar locking device comprising an elongated casing, a lock pin slidable in said casing, means for limiting longitudinal motion of said pin in said casing, a closure applied to one end of said casing, said closure having a key hole aperture, a tapered rod extending through said aperture, the larger part of said rod passing freely through the larger part of said aperture but incapable of passage through the smaller part of said aperture, a resilient connection between said rod and said pin, a washer slidable on the larger portion of said rod, said washer being mounted on said rod exterior of said closure.

4. For use on a tractor having a slide bar on which slides a swinging draw bar, and having alignable locking apertures, a locking device comprising a tubular casing, an ear on said casing for mounting said casing in alignment with said locking apertures, a locking pin slidable in said casing, a U-shaped link secured on one end of said pin, a stop member secured in said casing and extending through said link, a closure for the end of said casing remote from said pin, said closure having a key hole aperture therein, an actuating rod extending through said aperture, one end of said rod being of less diameter than the other, the smaller end of said rod extending into said casing, a spring secured between said link and said rod, the smaller end of said rod being receivable in the smaller portion of said key hole aperture.

References Cited in the file of this patent

UNITED STATES PATENTS

| Number | Name | Date |
|---|---|---|
| 1,715,682 | Starks | June 4, 1929 |
| 2,476,511 | Ruth | July 19, 1949 |
| 2,579,232 | Hansen | Dec. 18, 1951 |
| 2,591,916 | Caughman | Apr. 8, 1952 |

FOREIGN PATENTS

| Number | Country | Date |
|---|---|---|
| 622,426 | Great Britain | May 2, 1949 |